United States Patent
Lidstrom (10) Patent No.: US 10,038,386 B2
(45) Date of Patent: Jul. 31, 2018

(54) MAGNETRON POWER SUPPLY

(75) Inventor: Kjell Lidstrom, Burea (SE)

(73) Assignee: Ceravision Limited, Milton Keynes (GB)

( * ) Notice: Subject to any disclaimer, the term of this patent is extended or adjusted under 35 U.S.C. 154(b) by 0 days.

(21) Appl. No.: 13/806,433

(22) PCT Filed: Jun. 17, 2011

(86) PCT No.: PCT/GB2011/000920
§ 371 (c)(1),
(2), (4) Date: Dec. 21, 2012

(87) PCT Pub. No.: WO2011/161401
PCT Pub. Date: Dec. 29, 2011

(65) Prior Publication Data
US 2013/0100709 A1    Apr. 25, 2013

(30) Foreign Application Priority Data
Jun. 21, 2010 (GB) .................................. 1010358.8

(51) Int. Cl.
*H02M 3/335* (2006.01)
*H05B 6/68* (2006.01)

(52) U.S. Cl.
CPC ........ *H02M 3/33569* (2013.01); *H05B 6/685* (2013.01)

(58) Field of Classification Search
CPC ............... H02M 3/337; H02M 3/3376; H02M 3/33592; Y02B 70/1433; Y02B 70/1475
See application file for complete search history.

(56) References Cited

U.S. PATENT DOCUMENTS

| | | | |
|---|---|---|---|
| 4,680,506 A * | 7/1987 | Nilssen | 315/102 |
| 4,873,408 A | 10/1989 | Smith | |
| 4,882,663 A * | 11/1989 | Nilssen | 363/19 |
| 4,939,632 A | 7/1990 | Plagge | |
| 4,956,581 A * | 9/1990 | Nilssen | 315/101 |
| 5,082,998 A | 1/1992 | Yoshioka | |
| 5,208,432 A | 5/1993 | Han | |
| 5,636,106 A * | 6/1997 | Batarseh et al. | 363/16 |
| 5,642,268 A | 6/1997 | Pratt | |
| 2009/0190382 A1 * | 7/2009 | Usui | 363/89 |

FOREIGN PATENT DOCUMENTS

| | | | |
|---|---|---|---|
| GB | 2348496 A * | 10/2000 | |
| WO | WO2012/007713 A1 | 1/2012 | |

* cited by examiner

*Primary Examiner* — Nguyen Tran
*Assistant Examiner* — Monica Mata
(74) *Attorney, Agent, or Firm* — Bay State IP, LLC (57) ABSTRACT

A power supply for a magnetron has a high voltage converter, a microprocessor and a resistor. The high voltage converter comprises an integrated circuit oscillator, switching transistors, an inductance L1, a transformer and a rectifier. A voltage source supplies an augmented DC voltage to the converter. An operational amplifier, arranged as an error signal magnifier with an integrating capacitor and a resistor, compares a control signal from the microprocessor and the resistor and supplies an output signal to the oscillator. The oscillator controls the switching transistors, the output of which is connected to the inductance and the primary winding of the transformer. The secondary winding of the transformer is connected to half bridge diodes and capacitors, which provide DC current from the transformer to the magnetron.

17 Claims, 6 Drawing Sheets

MAGNETRON POWER SUPPLY

CROSS REFERENCE TO RELATED APPLICATION

This application is for entry into the U.S. National Phase under § 371 for International Application No. PCT/GB2011/000920 having an international filing date of Jun. 17, 2011, and from which priority is claimed under all applicable sections of Title of the United States Code including, but not limited to, Sections 120, 363, and 365(c), and which in turn claims priority under 35 USC 119 to United Kingdom Patent Application No. 1010358.8 filed on Jun. 21, 2010.

BACKGROUND OF THE INVENTION

Field of the Invention

The present invention relates to a power supply for a magnetron, in particular but not exclusively for use with a magnetron powering a lamp.

Description of the Related Art

It is known that magnetrons can change mode unexpected, that is to say that unexpectedly they can stop oscillating at one frequency and start oscillating at another. Under these conditions, they can exhibit negative impedance. This can result in damagingly high current flow. For this reason, it is known that constant/controlled voltage power supplies are not suitable for magnetrons; constant/controlled current power supplies are usually used for powering them.

Anode voltages in magnetrons are high and measurement of both anode voltage and anode current are difficult.

In a previous power supply invented by the present inventor, measurement of both voltage applied to a converter in a magnetron power supply and current through the converter was utilised in a conjunction with a microcomputer to provide real time control of power supplied to a magnetron. The microcomputer was programmed to compute:
1. Power being consumed,
2. A difference from a desired power and
3. A difference between the power difference and the measured current.

This second difference signal was used to control the converter. It should be noted that these three steps were executed in software. Unexpectedly, this power supply still suffered from a degree of instability, causing perceivable flickering of the light produced by its magnetron powered lamp.

Experience has now shown that the eye is extremely sensitive to light flicker in a magnetron powered plasma lamp. It has now been appreciated that the limited speed and resolution of the microprocessor output capability aggravated the perceived flickering. Additionally, two of the inputs to the microprocessor, namely the voltage applied to the converter and the current drawn through the converter are liable to be noisy and multiplication of the two noisy signals is believed to have contributed to the instability.

Simply filtering of the noise from the microprocessor reduces unacceptably the reaction time of the control circuit and contributes to instability, bearing in mind that fast reaction to changed magnetron conditions can be required. Accordingly a new approach was required.

SUMMARY OF THE INVENTION

The object of the present invention is to provide an improved power supply for a magnetron.

According to the invention there is provided a power supply for a magnetron comprising:
 a DC voltage source;
 a converter for raising the output voltage of the DC voltage source, the converter having:
  a capacitative-inductive resonant circuit,
  a switching circuit adapted to drive the resonant circuit at a variable frequency above the resonant frequency of the resonant circuit, the variable frequency being controlled by a control signal input to provide an alternating voltage,
  a transformer connected to the resonant circuit for raising the alternating voltage,
  a rectifier for rectifying the raised alternating voltage to a raised DC voltage for application to the magnetron;
 means for measuring the current from the DC voltage source passing through the converter;
 a microprocessor programmed to produce a control signal indicative of a desired output power of the magnetron; and
 an integrated circuit arranged in a feed back loop and adapted to apply a control signal to the converter switching circuit in accordance with a comparison of a signal from the current measuring means with the signal from the microprocessor for controlling the power of the magnetron to the desired power;
 wherein
  the integrated circuit can react to a change in the measured power consumption of the magnetron independently of a change in the control signal from the microprocessor.

Provision of the integrated circuit as a discrete element separate from the microprocessor provides a fast control loop, which is not limited by the speed of the microprocessor. (The latter is liable to be slow due to economic constraints on it specification.) Thus the power supply of the invention is inherently more stable and provides less flicker-prone illumination.

Whilst it can be envisaged that the integrated circuit could be a digital device, in the interests of economy, it is preferably an analogue device. In the preferred embodiment, the integrated circuit is an operational amplifier.

In the preferred embodiment the operational amplifier is arranged as an integrator with a feedback capacitor whereby its output voltage is adapted to control a voltage to frequency circuit for controlling the converter.

Preferably the microprocessor is programmed to filter noise from the desired converter current signal. Alternatively a filter circuit can be provided between the microprocessor and the operational amplifier.

In the preferred embodiments, the switching circuit is adapted to control the frequency of the converter in accordance with a variable voltage signal output from the operational amplifier. In this technique, an increase in frequency corresponds to a reduction in magnetron drive voltage and microwave output.

Alternatively the switching circuit can be adapted to control the duty cycle of the converter in accordance with the operational amplifier output, whereby reduction in the duty cycle corresponds to a reduction in magnetron drive voltage and microwave output.

In the preferred embodiments, the converter is a zero voltage switching device; although it could be a zero current switching device.

Normally the switching circuit will have its own oscillator; however, it can be envisaged that it could be timed from a clock in the microprocessor.

In one embodiment, the integrated circuit is adapted and arranged for the comparison to be direct between the measured current signal and the desired power signal, the integrated circuit being connected to receive these signals only, whereby the converter current is controlled in accordance with the desired power independent of transient changes in the voltage of the DC voltage source. This embodiment controls the average power to be constant over voltage source ripple cycles.

In another embodiment, the integrated circuit is adapted and arranged for the comparison to be not only between the measured current signal and the desired power signal but also taking account of transient changes in the voltage of the DC voltage source, a signal indicative of the voltage of the voltage source also being input to the integrated circuit, whereby the converter current is controlled such that the power passing through the converter is controlled in accordance with the desired power. This embodiment controls the instantaneous power constant to be constant through voltage source ripple cycles.

Normally the switching circuit will have its own oscillator; however, it can be envisaged that it could be timed from a clock in the microprocessor.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENTS

Figure 1:
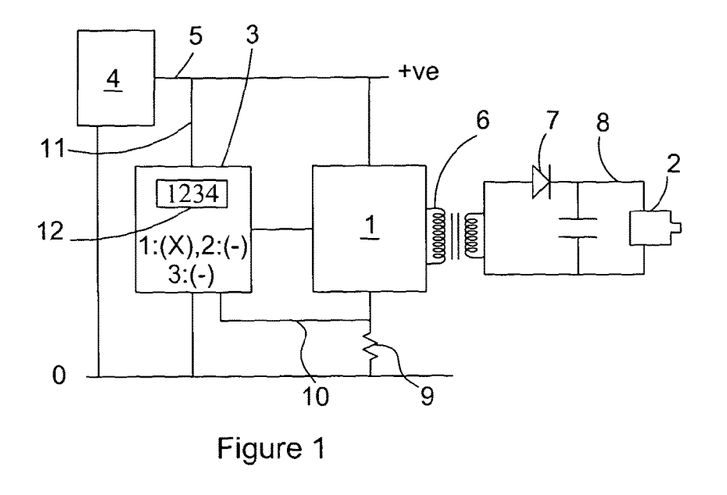
FIG. 1 is a block diagram of a pri or power supply for a magnetron.

Referring first to FIG. 1, there is shown diagrammatically a prior power supply having an oscillator 1 connected to power a magnetron 2 and controlled by a microprocessor 3. An augmented mains voltage, DC voltage source 4 supplies typically 400 volts on line 5 to the oscillator 1. This feeds alternating current to a transformer 6 and rectifier 7 from which 4000 DC volts is applied on line 8 to the magnetron. The oscillator, transformer and rectifier are referred to as a "high voltage converter". Power being supplied to the magnetron is measured in terms of the voltage across a resistor 9 in the earth return of the converter. The voltage is indicative of the current in the resistor 9 and is proportional to the power applied to the magnetron, assuming constant voltage from the voltage source 4. The resistor voltage is one input on line 10 to the microprocessor. Another input on line 11 applies the voltage on line 5 to the microprocessor. A desired power control value 12 is set externally or as a manual input to microprocessor.

The microprocessor is programmed to perform the steps of:

1. Multiplication of the voltage on line 5 with current in resistor 9 to compute the power being supplied to the magnetron, assuming high efficiency;
2. Comparison of the computation of the power being consumed with the desired power and thence a computation of the current that should be being consumed (the intended current);
3. Comparison of the intended current with the measured current and application to the power supply of an incrementally higher voltage to drive the converter at a higher frequency if the current is high or any incrementally lower voltage if the current is to low. It should be noted that if the converter operates at a higher frequency, the resultant voltage across the magnetron drops.

As already mentioned, this circuit proved in use to be too unstable for flicker free operation of the magnetron as a light source.

Figure 2:
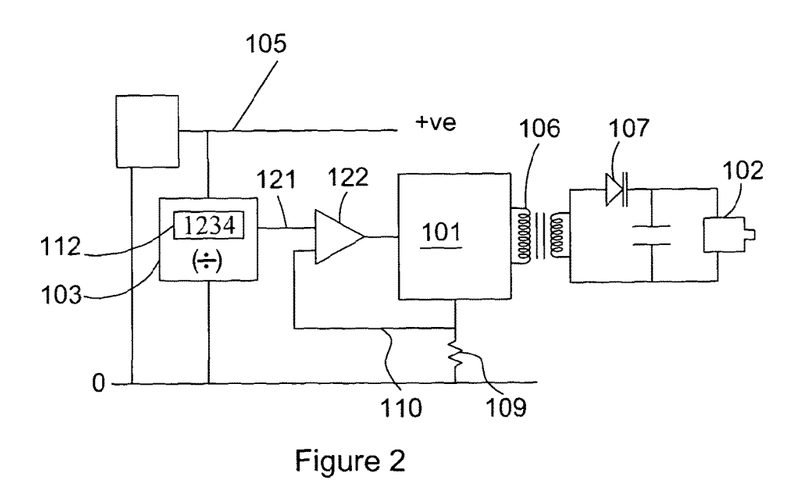
FIG. 2 is a similar block diagram of a power supply in accordance with the invention.

Turning now to FIG. 2, a power supply of the invention comprises the following similar components connected in the same manner:

oscillator/high voltage converter 101;
magnetron 102;
transformer 106
rectifier 107
resistor 109.

A microprocessor 103 is also included, but it operates quite differently. It merely divides a desired power control value 112 by the augmented mains DC voltage on the line 105, and provides a required current signal on line 121 indicative of the desired current through the converter 101 to operate the magnetron at the desired power. The signal on line 121 is fed to one input of an operational amplifier 122/EA1. Its other input has a line 110 to it from the resistor 109, indicating the actual current passing through the converter. The operational amplifier is connected as an integrating error signal magnifier.

Figure 3:
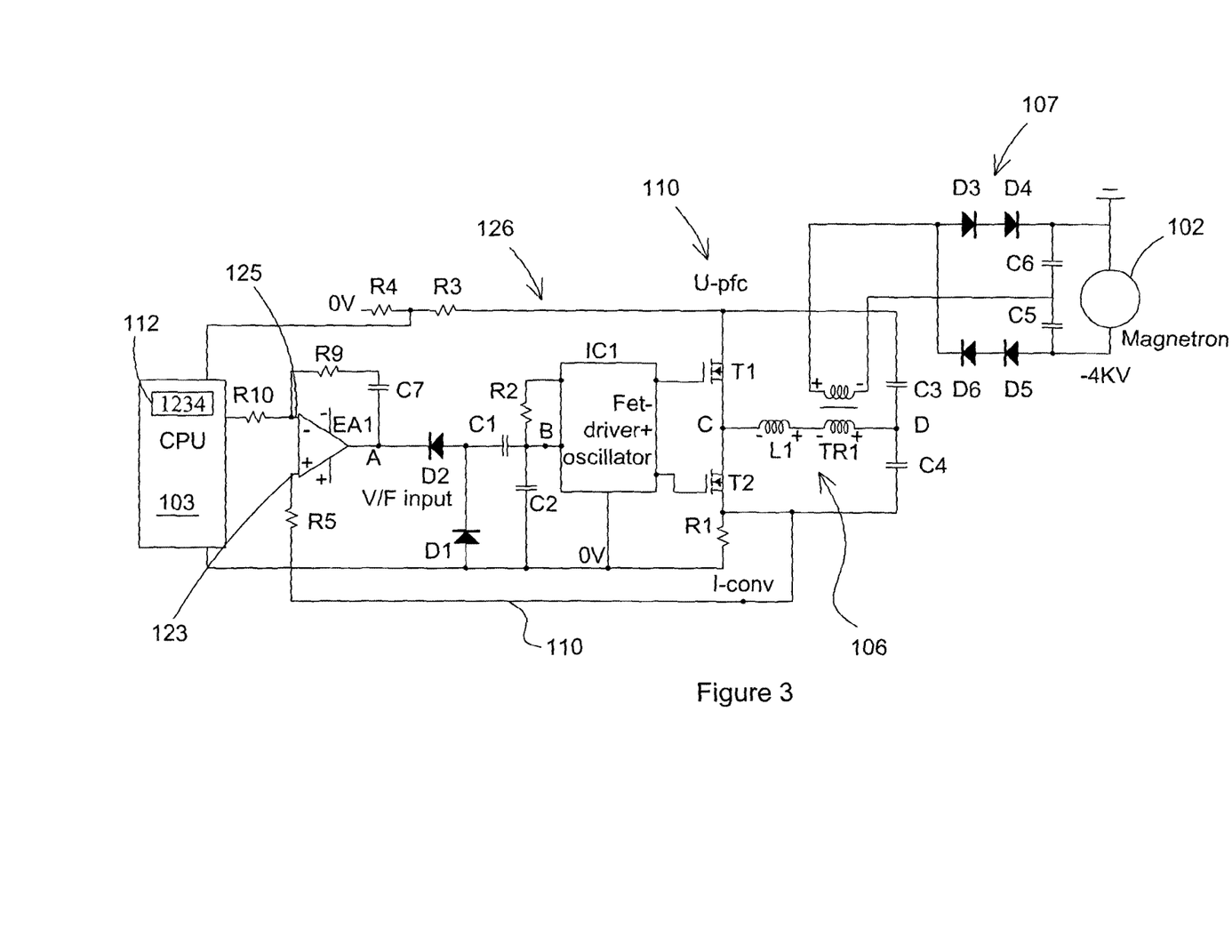
FIG. 3 is a more detailed circuit diagram of the power supply of FIG. 2.

Turning on now to FIG. 3 there is shown a fuller circuit diagram of the power supply of FIG. 2. Central to it is a quasi-resonant oscillator 101 of a high voltage converter, having MOSFET field effect switching transistors T1,T2. These are switched in a manner to be described below by an integrated circuit oscillator IC1. An inductance L1 and primary coil of the transformer 106 are connected in series to the common point of the transistors T1,T2. Capacitors C3,C4 complete the series resonant circuit. The inductances and the capacitors determine a resonant frequency, above which the converter is operated, typically around 70 kHz, whereby it appears to be primarily an inductive circuit as regards the downstream magnetron circuit. This comprises four half bridge diodes D3,D4,D5,D6 and smoothing capacitors C5,C6, connected to the secondary winding of the transformer and providing DC current to the magnetron 102. The windings ratio of the transformer is 10:1, whereby voltage of the order of 4000 volts is applied to the magnetron, the augmented mains DC voltage on line 105 typically being 400 volts.

A feature of the converter circuit is that when the transistors T1,T2 are switched ON and then OFF sequentially in turn, the energy stored in the inductance L1 inverts the voltage across it. This drives down the voltage at the common point C before TR2 switches on and drives up the common point voltage before TR1 switches on. Thus switching occurs at zero or close to zero volts across the transistor about to be switched on, that is in ZVS mode (Zero-Voltage-Switching mode). This contributes to reliability and longevity.

At high switching frequency (i.e. above resonance), the voltage at the common point between the capacitors C3,C4 is substantially constant at half the voltage on line 105, whereby on transistor switching, a substantially triangular wave form ramp current flows through the inductance L1. This is passed to the transformer and thence ultimately to the magnetron.

Lowering the frequency to operation closer to resonance increases the voltage swing at D away from half the voltage on line 105 and increases the voltage at the magnetron, its current and its microwave output.

The current through the converter is measured at resistor 109/R1, typically 100 mΩ, and a voltage indicative of it is passed via feedback resistor R5, typically 470 Ω, to one input 123 of the operational amplifier 122. The microprocessor 103, via a voltage divider R3,R4, receives the voltage from the line 105. A required power setting is set via a manual input 112. The microprocessor is programmed to divide the required power by the line voltage and apply to the other input 125 of the operational amplifier a voltage indicative of the converter current required for the required magnetron, via a 6 kΩ resistor R10. The operational amplifier has an integrating capacitor C7, typically 470 nF in series with a resistor R9 1 MΩ. The ratio of the resistors R9,R10 determines the gain of the operational amplifier. This again set to suppress mains voltage flicker as much as feasible. The amplifier passes an integrated voltage indicative of the required power to a frequency control circuit 126 for the oscillator IC1, which is a voltage to frequency circuit, typically Texas Instruments IRS2153 or ST Thomson L6569. The circuit comprising resistor R2 18 kΩ, capacitors C1,C2, both 470pF, and diodes D1,D2 operates to control the frequency of the converter. When the operational amplifier's output is zero, the capacitor C1 is in parallel with C2 and the lowest frequency is obtained. This corresponds to maximum magnetron power. On the other hand, when the output is maximum the diodes never conduct and the frequency is controlled by C2 alone. Maximum frequency and minimum power—of the order of one tenth of the maximum—is supplied. At intermediate voltages, C1 has an intermediate effect and the frequency and power is controlled accordingly.

Thus the magnetron can be controlled to operate at the desired power input to the microprocessor. The microprocessor is susceptible to flicker inducing variations in the voltage on line 105. However, the signal to R10 can be filtered internally by software or externally by a non-shown RC filter. Should the magnetron power consumption shift, as it can do as its magnets heat up and its resistance changes, the operational amplifier reacts fast to the change in current measured at the resistor R1 and adjusts the frequency of the converter and hence corrects the power consumption by the magnetron independently of the signal on line 125 from the microprocessor.

That said, if there is flicker on the voltage source line, the power of the magnetron will be constant only when averaged over the flicker period. There does tend to be double mains frequency flicker on the voltage source line, due to the cost of large smoothing capacitors.

It should be noted that the above described power supply is particularly suited to control of the LER magnetron powered lamp as described in WO 2009/063205. It enables the light output of the lamp to be controlled at will as and when required from low level for background light to full power full illumination.

Figure 4:
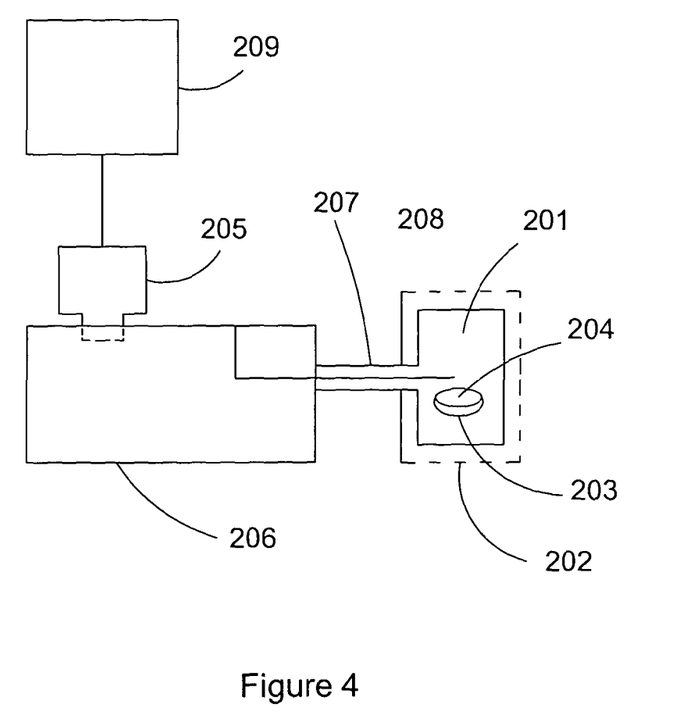
FIG. 4 is a diagrammatic view of a lamp powered by a magnetron having a power supply of the invention.

Shown in FIG. 4 is a simplified representation of a lamp driven by the magnetron. It has a lucent crucible 201 with a Faraday cage 202. A void 203 in the crucible has a fill 204 of excitable material. The magnetron 205 is arranged to project its microwaves into a waveguide/transition 206 from which they exit on a coaxial connection 207 to an antenna 208 releasing them into the crucible. Powering of the magnetron by a power supply 209 of the invention causes the excitable material to emit light. It is this light that the power supply of the invention is advantageous for in avoiding flickering.

Figure 5:
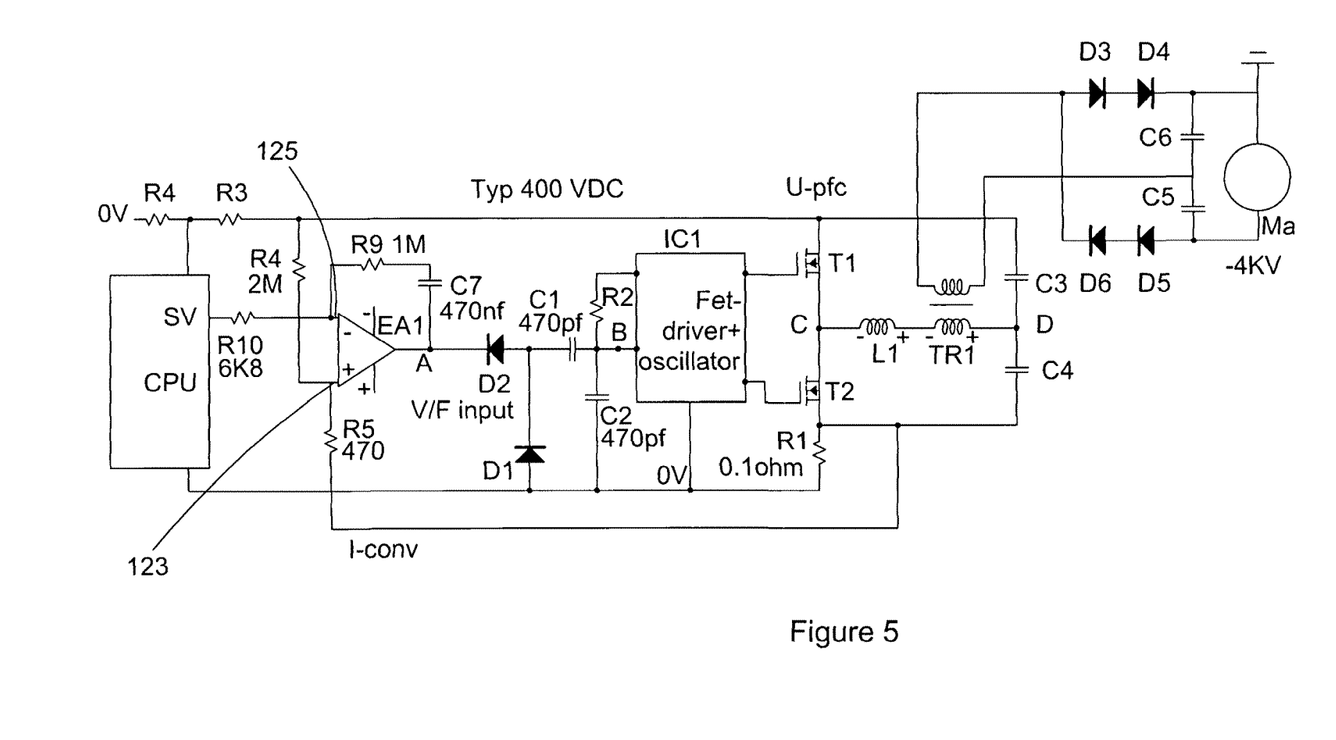
FIG. 5 is a circuit diagram of a second embodiment of the invention.

Turning now to FIG. 5, there is shown an improved high voltage converter, also in accordance with the invention. It takes account not only of variations in the converter current, and hence the magnetron current, but also mains frequency ripple—or more precisely twice main frequency ripple on the output of the voltage source. This ripple does not cause perceptible flicker in the light from the LER, but does induce bandwidth spreading in the output of the magnetron.

The modification of FIG. 5 is the inclusion of a resistor R6, in the form of two 1MΩ resistors in series, from the voltage source line to the operational amplifier input 123 to which the feed back resistor R5 is connected. The resistors R6-R5 form a voltage divider. The divider is such that the voltage across the resistor R5 is substantially the same as the voltage across the current measuring resistor, typically both of the order of 100 mV, giving 200 mV at the operational amplifier input. The actual voltage varies with both the actual current in the converter and the actual voltage on the voltage source line. It will be appreciated that an increase in the operational amplifier input of 200 mV due to increase in the voltage source line will be equivalent to an increase in the operational amplifier input 200 mV due to increase in the current. Both raise the integrated output voltage of the operational amplifier, with the result that the controlled current is reduced.

The actual increase in operational amplifier input due to a 5% increase in the voltage source voltage will be 5%, because the voltage across the current measuring resistor is small compared to the voltage source voltage. Equally for a 5% increase in current, the voltage across the current measuring resistor will be 5%. This will be added to the voltage at the operational amplifier input. Thus for a 5% or other small percentage increase in the voltage or the current, the current will be reduced by the same percentage.

In turn this results in a 5% or other small percentage reduction in the power being applied to the magnetron. Thus the arrangement acts to keep instantaneous power constant. In this respect, instantaneous is used to mean that the power is kept constant throughout the cycle of the voltage ripples for instance.

This operation can be explained mathematically as follows:

The power of the magnetron is the product of the voltage source voltage U and the converter current I, i.e.

$$P = U \times I.$$

In terms of units of voltage and current, u and I:

$$P = (C_1 \times u) \times (C_2 \times i)$$

$$P = K \times (u \times i)$$

With u and i having unit value, this formula can be rewritten as $$P = K \times (u+i)/2.$$

This relationship remains approximately correct for small variations in voltage and current, i.e. for u±δu, i±δi.

The above equation can be rewritten as $$p = K_3 + K_4 \times \delta V + K_5 \times \delta v.$$

Thus the power of the magnetron can be represented as a constant plus another constant times any deviation of the actual voltage source from its nominal value plus another constant times any deviation of the current from a nominal current. The current deviation itself can be represented of the voltage across the current measuring resistor.

With appropriate constants, and considering only the variations input to the operational amplifier, it can be seen that the voltage divider does input the sum of the two variations in voltage source voltage and converter current to the operational amplifier. The only proviso is that the approximation $$P = U \times I \sim K \times (u+i)/2$$

Is satisfied only if the voltage across R5 is approximately equal to that across R1. This is satisfied for the values:
U=400 volts
R1=0.1 Ω
R5=470 Ω
R6=2 MΩ.

Figure 6:
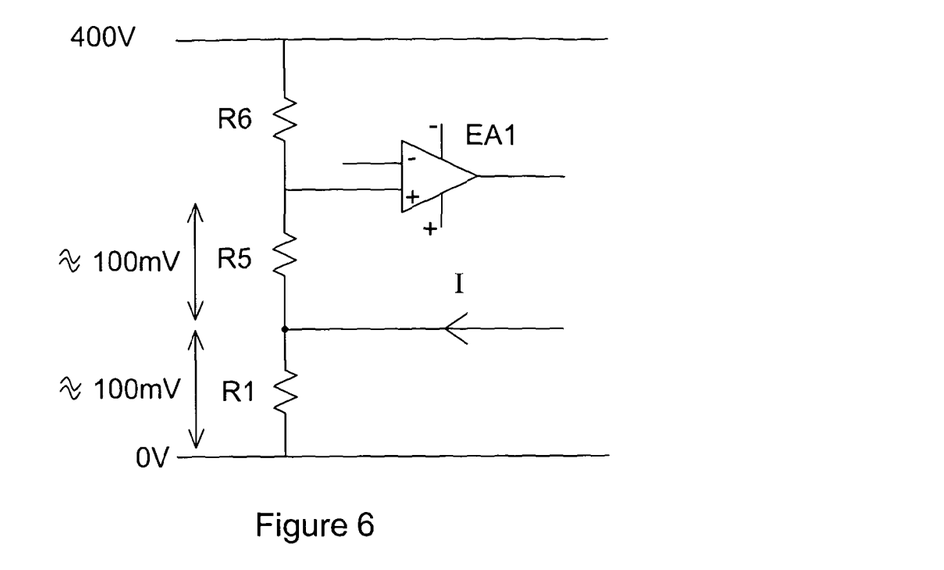
FIG. 6 is details of the voltage divider of the embodiment of FIG. 5.

These resistors are shown in series in FIG. 6, with indication of the relevant voltages also shown.

It should be noted that because R6 is seven orders of magnitude greater than R1 and R5 is four orders of magnitude greater, any change in U which create an appreciable change of voltage at the operational amplifier input is unlikely to cause an appreciable change of voltage across R1, whose voltage is controlled only by the current through it. Accordingly the voltage across R1 is added to that across R5 and the sum is input to the operational amplifier.

Figure 7:
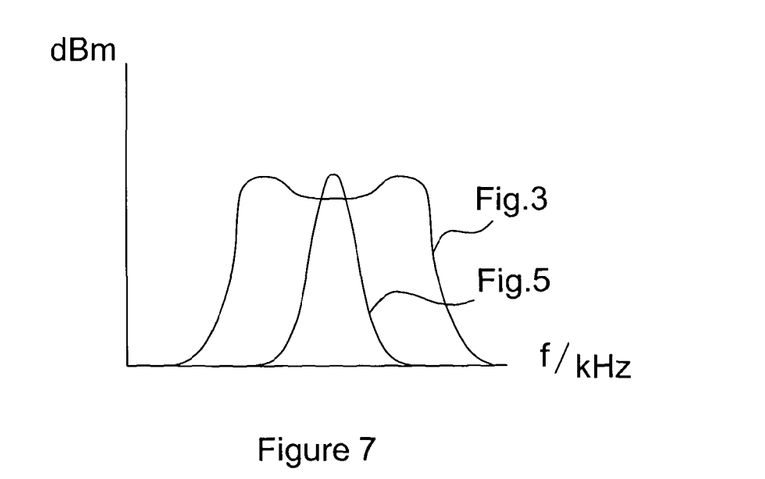
FIG. 7 is a spectral diagram of magnetron output comparing that of the embodiments of FIGS. 3 and 5.
Figure 8:
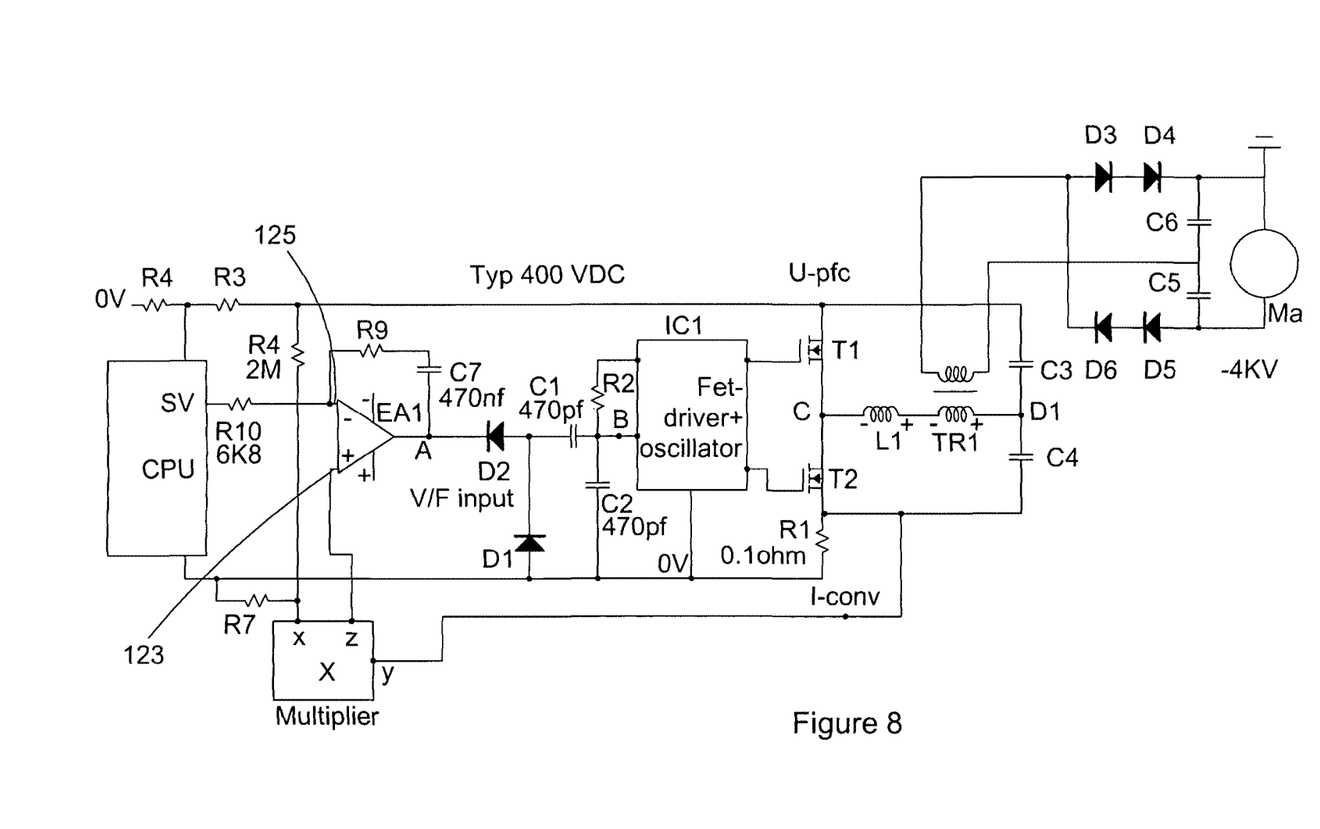
FIG. 8 is a circuit diagram of a third embodiment of the invention.

It will be appreciated that this means of operation is not exactly linear, but it does provide significant improvements. With reference to FIG. 7, there is shown a saddle shaped graph of the bandwidth of frequency of the magnetron's generation. Its generation frequency is dependent on the current through it, it being a feature of a magnetron that it has a characteristic akin to that of a zener diode in controlling the voltage across it. Thus if more power is available to it, its current increases and with its operating frequency is lowered. Where there is a mains voltage related ripple on the voltage of the voltage source, the magnetrons frequency varies and the bandwidth exhibits a slight saddle shape. By contrast, with the power control of the embodiment of FIG. 5, the bandwidth is much narrower and has a Gaussian distribution. This in its turn is advantageous in causing much less interference with Bluetooth communication networks and the like Turning on to FIG. 8, a multiplier circuit 301 is shown at the input to the operational amplifier. This circuit is an analogue device, although a digital device is conceivable, and has the midpoint of the common point of the R6-R7 potential divider applied to one input and voltage signal from the current measuring resistor R1 applied to the other input. The multiplier multiplies these two voltage and current indicating signals together to produced and apply to the input of the operational amplifier a signal indicative of the magnetron power. This embodiment is more precise than that of FIG. 5, but is more expensive in that multiplier circuits are little used and tend to be expensive. We regard the embodiment of FIG. 5 as being better in that it is adequately accurate and at the same time is cheaper.

The invention claimed is:

1. A power supply for a magnetron comprising:
   a DC Voltage source;
   a converter for raising the output voltage of the DC voltage source, the converter having:
      a capacitative-inductive resonant circuit,
      a switching circuit adapted to drive the resonant circuit at a variable frequency controlled by a control signal input to provide an alternating voltage,
      a transformer connected to the resonant circuit for raising the alternating voltage,
      a rectifier for rectifying raised alternating voltage to a raised DC voltage for application to the magnetron;
   means for measuring the current from the DC voltage source passing through the converter;
   a microprocessor programmed to produce a control signal indicative of a desired output power of the magnetron; and
   an integrated circuit adapted to apply a control signal to the converter switching circuit, characterized in that:
   the variable frequency at which the switching circuit is adapted to drive the resonant circuit is above the resonant frequency of the resonant circuit; and
   the integrated circuit is arranged in a feedback loop to apply a control signal to the converter switching circuit in accordance with a comparison of a signal from the current measuring means with the signal from the microprocessor for controlling the power of the magnetron to the desired power; wherein
      the integrated circuit can react to a change in the measured power consumption of the magnetron independently of a change in the control signal from the microprocessor.

2. A power supply as claimed in claim 1, wherein the integrated circuit an analogue device.

3. A power supply as claimed in claim 2, wherein the integrated circuit is an operational amplifier connected as an error signal amplifier, the error signal being the difference between signals indicative of a measurement of the converter current and the desired output power of the magnetron.

4. A power supply as claimed in claim 1, wherein the integrated, circuit is arranged as an integrator with a feedback capacitor, whereby its output voltage is adapted to control a voltage-to-frequency circuit for controlling the converter.

5. A power supply as claimed in claim 1, wherein the integrated, circuit is adapted and arranged for the comparison to be direct between, the measured current signal and the desired power signal, the integrated circuit being connected to receive these signals only, whereby the converter current is controlled in accordance with the desired power independent of transient changes in the voltage of the DC voltage source.

6. A power supply as claimed in claim 5, wherein the current measuring means is a resistor in series with the converter, one end of the resistor being grounded and the other being connected to an input of the integrated circuit, via a feedback resistor.

7. A power supply as claimed in claim 1, wherein the integrated, circuit is adapted and arranged for the comparison to be not only between the measured current signal and the desired power signal but also taking account of transient changes in the voltage of the DC voltage source, a signal indicative of the voltage of the voltage source also being input to the integrated circuit, whereby the converter current is controlled, such that the power passing through the converter is controlled in accordance with the desired power.

8. A power supply claimed in claim 4, wherein:
the current measuring means is a resistor in series with the converter, one end of the resistor being grounded and
a potential divider is provided for input to the integrated circuit, the divider comprising two dividing resistors between an output rail of the DC voltage source and the non-grounded end of the current measuring resistor, with, the common connection of the two dividing resistors being connected to an input of the integrated circuit.

9. A power supply as claimed in claim 8, wherein
the current measuring means is a resistor in series with the converter, end of the resistor being grounded and
there is provided:
a potential divider comprising two dividing resistors between an output rail of the DC voltage source and a zero volts rail and
a multiplier circuit, the voltage at the current measuring resistor being applied to one multiplier input and the voltage at the common connection of the dividing resistors being applied to the other multiplier input and the multiplier output being applied to the integrated circuit for comparison with the microprocessor output.

10. A power supply as claimed in claim 1, wherein the microprocessor is programmed to filter noise from the desired converter current signal.

11. A power supply as claimed in claim 1, including a filter circuit provided between the microprocessor and the operational amplifier.

12. A power supply as claimed in claim 1, wherein the switching circuit is adapted to control the frequency of the converter in accordance with a variable voltage signal output from the operational amplifier, whereby an increase in frequency corresponds to a reduction in magnetron drive power and microwave output.

13. A power supply as claimed in claim 1, wherein the switching circuit is adapted to control the duty cycle of the converter in accordance with the integrated circuit output, whereby reduction in the duty cycle corresponds to a reduction in magnetron drive voltage and microwave output.

14. A power supply as claimed in claim 1, wherein the switching circuit is adapted to be timed from a clock in the microprocessor.

15. A power supply as claimed in claim 1, wherein the switching circuit has its own oscillator.

16. A power supply as claimed in claim 1, wherein the converter is a zero voltage switching device.

17. A power supply as claimed in claim 1, wherein the converter is a zero current switching device.

* * * * *